(12) United States Patent
Yousaf (10) Patent No.: US 10,979,321 B2
(45) Date of Patent: Apr. 13, 2021

(54) METHOD AND SYSTEM FOR LOW-LATENCY MANAGEMENT AND ORCHESTRATION OF VIRTUALIZED RESOURCES

(71) Applicant: NEC Laboratories Europe GmbH, Heidelberg (DE)

(72) Inventor: Faqir Zarrar Yousaf, Leimen (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/583,337

(22) Filed: Sep. 26, 2019

(65) Prior Publication Data
US 2020/0186446 A1 Jun. 11, 2020

Related U.S. Application Data

(60) Provisional application No. 62/777,263, filed on Dec. 10, 2018.

(51) Int. Cl.
*H04L 12/24* (2006.01)
*G06F 9/50* (2006.01)
*G06F 9/455* (2018.01)

(52) U.S. Cl.
CPC ...... *H04L 41/5054* (2013.01); *G06F 9/45558* (2013.01); *G06F 9/5077* (2013.01);
(Continued)

(58) Field of Classification Search
CPC ............... G06F 9/45558; G06F 9/5077; G06F 2009/45562; G06F 2009/45595;
(Continued)

(56) References Cited

U.S. PATENT DOCUMENTS 9,769,694 B2 * 9/2017 Chou ............... H04W 28/0226
9,985,866 B1 * 5/2018 Rajagopal ............... H04W 8/02
(Continued)

FOREIGN PATENT DOCUMENTS

WO WO-2018024341 A1 * 2/2018 ............ H04M 15/00
WO 2018/202814 A1 11/2018

OTHER PUBLICATIONS

ETSI GR NFV-IFA 028 v3.1.1, "Network Functions Virtualisation (NFV) Release 3; Management and Orchestration; Report on architecture options to support multiple administrative domains," Jan. 2018.
(Continued)

*Primary Examiner* — Thomas J Dailey
(74) *Attorney, Agent, or Firm* — Leydig, Voit & Mayer, Ltd.

(57) ABSTRACT

A method provides a distributed and granular management and orchestration of virtualized functions (VFs). The method includes instantiating a network function virtualization management and orchestration (NFV-MANO) system that is configured to instantiate micro-functions (MFs) and to link each of the instantiated MFs to a corresponding one of the VFs. Also, a MF of the MFs is instantiated and linked the MF to a VF of the VFs. The instantiated MF is configured to provide at least one service of the NFV-MANO system to the VF to which it is linked. The instantiated MF and the VF are configured to expose interfaces over which they can interface with each other.

16 Claims, 9 Drawing Sheets

(52) U.S. Cl.
CPC ........ *H04L 41/042* (2013.01); *H04L 41/0806* (2013.01); *H04L 41/5009* (2013.01); *H04L 41/5051* (2013.01); *H04L 41/5058* (2013.01); *G06F 2009/45562* (2013.01); *G06F 2009/45595* (2013.01)

(58) Field of Classification Search
CPC ............ H04L 41/5009; H04L 41/5051; H04L 41/5054; H04L 41/042; H04L 41/0806; H04L 41/5058
See application file for complete search history.

(56) References Cited

U.S. PATENT DOCUMENTS

| | | | |
|---|---|---|---|
| 10,069,844 B2* | 9/2018 | Paczkowski | H04L 63/123 |
| 10,073,729 B2* | 9/2018 | Liu | H04L 41/0677 |
| 10,116,571 B1* | 10/2018 | Bertz | H04L 67/38 |
| 10,177,982 B2* | 1/2019 | Yu | H04L 41/082 |
| 2016/0124742 A1* | 5/2016 | Rangasamy | H04L 41/0803 |
| | | | 717/103 |
| 2017/0104609 A1* | 4/2017 | McNamee | H04M 15/61 |

OTHER PUBLICATIONS

ETSI GR NFV-IFA 022 v3.1.1, "Network Functions Virtualisation (NFV) Release 3; Management and Orchestration; Report on Management and Connectivity for Multi-Site Services," Apr. 2018.
ETSI GS NFV-MAN 001 v1.1.1, "Network Functions Virtualisation (NFV); Management and Orchestration," Dec. 2014.

* cited by examiner

METHOD AND SYSTEM FOR LOW-LATENCY MANAGEMENT AND ORCHESTRATION OF VIRTUALIZED RESOURCES

CROSS-REFERENCE TO RELATED APPLICATIONS

Priority is claimed to U.S. Provisional Patent Application No. 62/777,263, filed on Dec. 10, 2018, the entire disclosure of which is hereby incorporated by reference herein.

FIELD

The present invention relates to a method and system for a highly distributed low-latency management and orchestration of virtualized resources.

BACKGROUND

A Management and Orchestration (MANO) system is used for the management of resources of a cloud infrastructure, such as a Network Function Virtualization Infrastructure (NFVI). These cloud infrastructure resources can be both physical and virtual.

Examples of physical resources include: compute, network, storage, and memory resources. Examples of such virtual resources include: Virtualized Network Functions (VNF), Network Services (NS), and/or Virtual Links (VL). The NS can be composed of a single VNF or it can be composed of multiple VNFs that are chained together via Virtual Links (VL) in a specific topology represented by some forwarding graph (e.g., a VNF Forwarding Graph (VNFFG)). It is the NS that delivers the desired service(s). An example of a NS is a virtualized EPC (vEPC) network, which may also contain other VNFs such as virtual Firewall (vFW), virtual Load Balancer (vLB), etc.

The main task of the MANO system is to ensure efficient management and orchestration of the virtual resources while maximizing the resource utilization (but at a lower cost), while also ensuring the end-to-end service integrity of the NS. Typical MANO tasks include the FCAPS (Fault, Configuration, Accounting, Performance, and Security) management and Life Cycle Management (LCM) of the NFVI assets. The LCM includes operations, such as deployment, instantiation, scaling, migration, update/upgrade, delete, configure, healing etc. of VNFs, NSs, and VLs.

Figure 1:
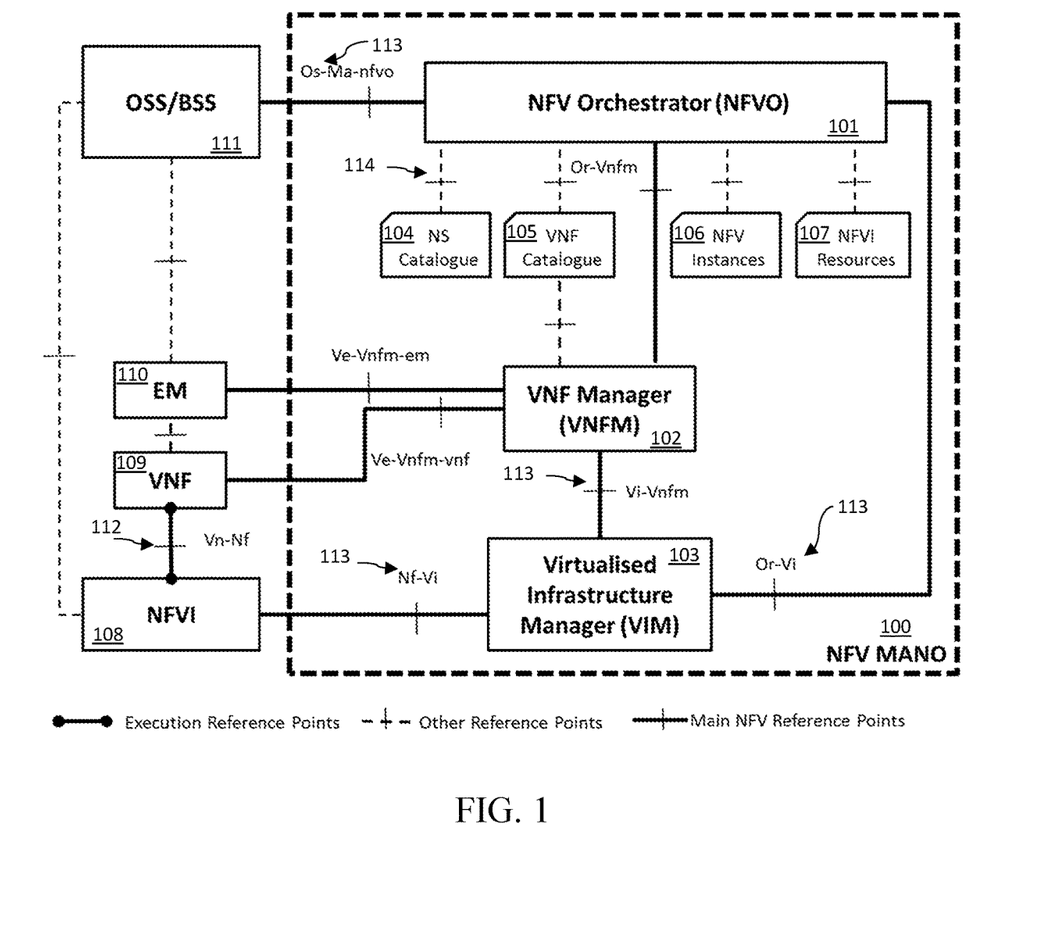
FIG. 1 illustrates an ETSI NFV-MANO system architecture.

An example of a standard NFV-MANO system 100 is depicted in FIG. 1, which has been standardized by the ETSI ISG NFV. This NFV-MANO 100 system is composed of three man functional blocks: NFV Orchestrator (NFVO) 101, VNF Manager (VNFM) 102 and Virtualized Infrastructure Manager (VIM) 103. The NFV MANO 100 also includes several repositories and descriptor files, for example: NS Catalogue 104, VNF Catalogue 105, NFV Instances 106, and NFVI Resources 107.

The combination of such functional blocks, repositories, and descriptor files enables the NFV MANO 100 to manage and orchestrate NFVI 108 resources, including VNFs 109 (or NSs made up of VNFs) as per some management and orchestration policy.

Each functional block of the NFV-MANO 100 system is assigned a specific set of functions that interact with the functionalities offered by other functional blocks over well-defined interfaces specified over the reference points (112-115). On a high level, a MANO system undertakes the following tasks: (1) Monitoring of managed entities and the virtualized infrastructure resources; (2) Collection of monitored KPIs and other relevant data; (3) Analysis of the collected KPIs; (4) Derivation of appropriate lifecycle management actions based on events analyzed; and (5) Execution of lifecycle management actions.

FIG. 1 also illustrates various reference points (112-114) between the NFV-MANO functional blocks, repositories and descriptor files, and other functional blocks in the NFV architecture. Well defined interfaces are defined over these reference points that enable interactions (e.g., communications) between these elements of the NFV architecture. The architecture shown in FIG. 1 differentiates between three types of reference points: execution reference points 112 (e.g., the Vn-Nf reference point 112 between the NFVI 108 and a VNF 109), main NFV reference points 113 (e.g., the Vi-Vnfm main reference point 113 between the VIM 103 and the VNFM 102, the Nf-Vi main reference point 113 between the NFVI 108 and the VIM 103, the Or-Vi main reference point 113 between the NFVO 101 and the VIM 103), and other reference points 114 (e.g., the other reference point 114 between the NFVO 101 and the NS Catalogue 104). The differentiation among the execution, main, and other reference points (112-114) is based on the ETSI standard.

The NFV architecture shown in FIG. 1 also illustrates an operation system support (OSS) and business system support (BSS) functional block 111 and an element management (EM) functional block 110. The OSS/BSS 111 are the combination of the operator's other operations and business support functions that are not otherwise explicitly captured in the present architectural framework, but are expected to have information exchanges with functional blocks in the NFV-MANO 100 architectural framework over well-defined interfaces specified over the Os-Ma-nfvo main reference point 113. OSS/BSS 111 functions may provide management and orchestration of legacy systems and may have full end-to-end visibility of services provided by legacy network functions in an operator's network. The EM 110 is responsible for FCAPS management functionality for a VNF 109 (e.g., configuration, fault management, usage accounting, performance measurements, and security). The EM 110 may be aware of virtualization, and collaborate with the VNF Manager 102 over the Ve-Vnfm-em main reference point 113 to perform those functions that require exchanges of information regarding the NFVI Resources 107 associated with the VNF 109.

The NFV-MANO system is typically expected to manage and orchestrate 1000$s$ of VNF/NS instances within a datacenter (i.e., in an NFVI). The VNF/NS instances may belong to different tenants with varying policies that poses a challenge to the NFV-MANO system to ensure that each tenant's QoS objectives are met. The NFV-MANO system relies on an effective monitoring system to receive KPI related data from the various resources that can be analyzed internally in order to make effective MANO decisions. However, the increase in the scale of the VNFs/NSs will impact the MANO performance in terms of high processing/protocol/monitoring load leading to delays in deriving optimum management decisions on actions.

In consideration of the dynamic network conditions, such delays can lead to stale decisions that may be counter-productive, especially for low-latency services. Moreover, the NFV-MANO system poses as a single point of failure. The performance of the NFV-MANO can further degrade when it has to manage VNF(s)/NS(s) in a multi-site multi-domain environment, where the NS(s) are deployed spanning multiple NFVI-PoPs that may or may not belong to the same administrative domain.

To address the above issues, there have been proposals to distribute the MANO system. A recent proposal (PCT/EP 2018/061426, the entire contents of which is hereby incorporated by reference herein) instructs the distribution of MANO by providing each tenant with its own virtual MANO stack, referred to as tenant-MANO (t-MANO), in order to enable the tenants to manage VNF(s)/NS(s) within its own resource domain without relying entirely on the central-MANO system (c-MANO). The c-MANO has full admin rights over the t-MANO instances and the functionalities and operational capabilities of the t-MANO are bounded within prescribed functional/operational limits as negotiated with the c-MANO. However, even in this approach, the t-MANO serves as a central MANO system with respect to the VNF(s)/NS(s) that are deployed and managed within the tenant's domain, and the problems discussed above are relevant within the tenants' domain. The larger the resource domain of the tenant, the more VNF/NS instances are and the more geographically distributed they are, and thus the more pronounced the highlighted issues will be.

SUMMARY

An embodiment of the present invention provides a method for distributed and granular management and orchestration of virtualized functions (VFs). The method includes instantiating a network function virtualization management and orchestration (NFV-MANO) system that is configured to instantiate micro-functions (MFs) and to link each of the instantiated MFs to a corresponding one of the VFs. Also, a MF of the MFs is instantiated and linked the MF to a VF of the VFs. The instantiated MF is configured to provide at least one service of the NFV-MANO system to the VF to which it is linked. The instantiated MF and the VF are configured to expose interfaces over which they can interface with each other.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a highly distributed and survivable management and orchestration (MANO) system, whereby the traditional MANO system is decomposed and modularized into a set of independent and self-contained management functional entities referred to as micro-management function (mMF). Each mMF entity has a specific management role. This enables the mMF to be assigned to each individual VNF or VNF Component(s) (VNFC) in a network service (NS) to ensure local and VNF-specific dispensation of management with minimum reliance on central MANO system.

Embodiments of the present invention provide an improved Micro-MANO system that enables low-latency management and orchestration of virtualized resources. An embodiment includes a hyper-distributed MANO system providing management and orchestration of virtualized infrastructure assets at a fine granular level by leveraging the concept of micro-services and service based architecture (SBA). In an embodiment, a method of the present invention can also be applied to physical (application/network) functions. While methods of the present invention can be applied to any MANO system, embodiments will be described with reference to the standard NFV-MANO system framework.

Embodiments of the present invention provide an improved MANO system that moves away from a fixed (rigid) architecture to a more flexible/elastic service-based approach by distributing the MANO tasks/functions at a fine granular level. This is achieved by decoupling the various MANO functions from their respectively assigned functional blocks and hosting each function individually as a micro-function (mF).

An embodiment of the present invention provides a distributed management and orchestration system that decouples the various MANO functions from their respectively assigned functional blocks and hosts each function individually as independent micro-functions (mF). In this system, the mF(s) can be independently assigned (and/or associated) to virtualized functions (VF) with an N:N association between a mF and the vFs. The mFs associated with VF instances can link with each other to form a micro-management service (mMS) layer on top of the network/application service composed of one or more VFs. VF is a generic term that is used herein to mean VNF or Virtualized Application Function (VAF), unless mentioned specifically otherwise.

Embodiments of the present invention also provide a collection of catalogues, such as an mMS catalogue and mMF catalogue for maintaining deployment templates for mMS and mMF instances. An mMF repository may also be provided for onboarding software images of a variety of mMF software packages.

In an embodiment, a micro-function manager (MFM)—which may be standalone or integrated into an VNFM—is provided for the lifecycle management of mMF instances. Also, an embodiment may include A Micro-Management-Service Orchestrator (MMSO) for the lifecycle management of mMS Layer instances. The MMSO can be integrated with a main orchestrator of a MANO system, e.g., the NFVO of the NFV-MANO system.

Embodiments of the present invention provide an improved MANO system where MANO functions are decoupled and distributed as mFs, and which enable at least the following advantages over the state of the art: (i) fine granular management of virtual resources; (ii) reduced resource foot-print as each VF is associated with a mF (i.e., mMF); (iii) reduced processing and monitoring load on the main MANO system; (iv) targeted management of VFs; (v) reduced reaction time to events due to localized execution of management tasks making it suitable for low-latency NS and applications (i.e., provides low latency management services); (vi) efficient management of NS in a multi-site environment; (vii) highly flexible, agile, scalable and survivable; (viii) N:N association of the mF to the respective VFs; (ix) easy update/upgrades of mFs with minimum impact on other mFs and services; (x) provisioning of localized and customized management services.

An embodiment of the present invention provides a method for distributed and granular management and orchestration of virtualized functions (VFs). The method includes instantiating a network function virtualization management and orchestration (NFV-MANO) system that is configured to instantiate micro-functions (MFs) and to link each of the instantiated MFs to a corresponding one of the VFs. Also, a MF of the MFs is instantiated and linked the MF to a VF of the VFs. The instantiated MF is configured to provide at least one service of the NFV-MANO system to the VF to which it is linked. The instantiated MF and the VF are configured to expose interfaces over which they can interface with each other.

The MF may be instantiated in a virtual machine, in a virtual container, or in a container hosted in the virtual machine.

At least one service of the NFV-MANO system can implement at least one of a service of a network function virtualization orchestrator (NFVO), virtualized network function manager (VNFM), or a virtualized infrastructure manager (VIM).

In an embodiment, the method further includes instantiating a second MF of the MFs and linking the second MF to a second VF of the VFs. Also, the MF and the second MF may be linked together to form a micro-management service (mMS) layer on top of a network service comprising the VF and the second VF.

The method may further include executing life cycle management (LCM) operations for at least one of the MF, the second MF, and the mMS layer, the LCM operations including at least one of scale, migrate, update, upgrade, deploy, instantiate, configure, or resource management.

The method may further include monitoring performance of at least one of the MF, the second MF, and the mMS layer to ensure management autonomy of the respective MFs within subscribed bounds.

The NFV-MANO system of an embodiment is an extended NFV-MANO system that now includes a micro-management service orchestrator (MMSO). The MMSO can be configured to manage a lifecycle of at least one mMS Layer instance. The mMS Layer instance can be made up of the instantiated MF linked to the corresponding instantiated VF. The extended NFV-MANO system can also include a micro-function manager (MFM), which is configured to manage a lifecycle of the instantiated MF.

The NFV-MANO can include at least one of a catalogue or a repository that contains at least one of information for instantiating a micro-management service (mMS) layer which is formed by linking at least two of the MFs, information on characteristics of virtual links (VLs) for linking the MFs and the VFs, and information on infrastructure resources associated with the NFV-MANO.

The NFV-MANO can include at least one of a catalogue or a repository that contains at least one of a deployment template describing at least one of the MFs in terms of deployment and operation behavior requirements, and connectivity, interface, or KPI requirements for establishing virtual links (VLs) between MFs.

The NFV-MANO can include at least one of a catalogue or a repository that contains at least one of run-time information of the MFs or a micro-management service (mMS) layer, which is instantiated by linking at least two of the MFs, that are instantiated.

In an embodiment, the method further includes instantiating a virtualized network function descriptor (VNFD) that is configured to identify a type and capability of the MF to which it is to interface.

The VF can be one of a virtualized application function (VAF) or a virtualized network function (VNF). The VF can be part of a network service (NS).

Another embodiment of the present invention provides a management and orchestration (MANO) system that has a processor coupled to a non-transitory storage memory containing instructions, which when executed by the processor, cause MANO system to: instantiate a micro-function (MF) and link the MF to a virtualized function (VF). The instantiated MF is configured to provide at least one service of the MANO system only to the VF to which it is linked. The instantiated MF and the VF are configured to expose interfaces over which they can interface with each other.

Another embodiment of the present invention provides a non-transitory processor-readable storage medium storing instructions that upon execution cause a management and orchestration (MANO) system to instantiate a micro-function (MF) and link the MF to a virtualized function (VF). The instantiated MF is configured to provide at least one service of the MANO system only to the VF to which it is linked. The instantiated MF and the VF are configured to expose interfaces over which they can interface with each other.

Figure 2:
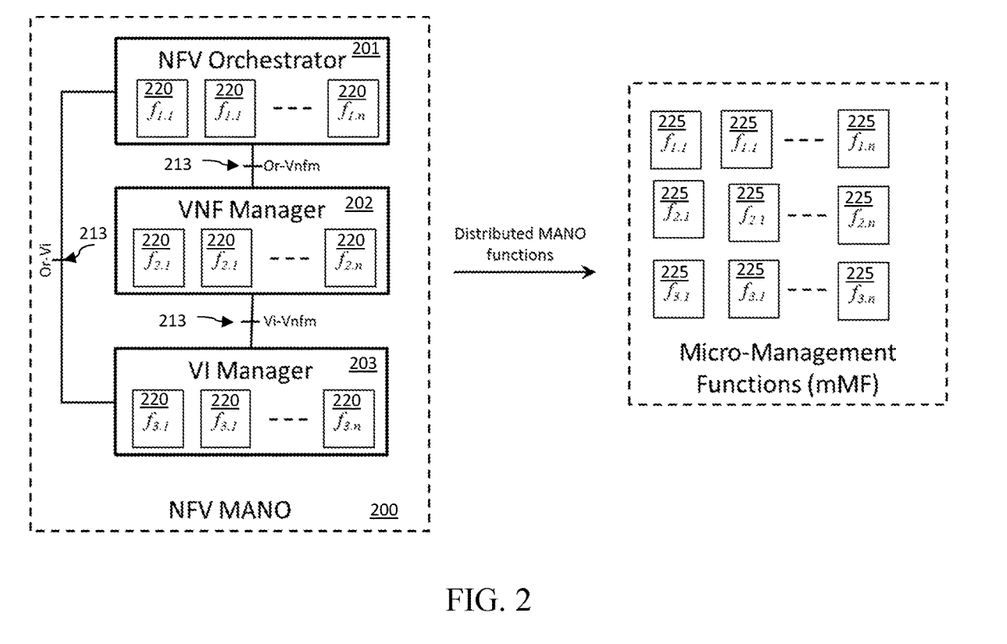
FIG. 2 illustrates an example micro-MANO function (mMF) decoupling according to the present invention.

An example of the decoupled feature of the present invention is depicted in FIG. 2, with reference to an NFV-MANO system 200. FIG. 2 shows the decoupling of the functions 220 (e.g., $f_{1.1}$, $f_{2.1}$, $f_{3.1}$, etc.) from their respective NFV-MANO functional blocks (i.e., NFVO 201, VIM 203, VNFM 203) as independent micro-MANO Function (mMF) entities 225.

For example, the functions 220 $f_{1.n}$, $f_{2.n}$ and $f_{3.n}$ that would have originally been assigned to the NFVO 201, VNFM 202, and VIM 203 functional blocks of the NFV-MANO system 200 (e.g., such as described in the ETSI standard) are—in the present invention—decoupled and exist as independent functional blocks 225. Within the NFV-MANO system 200, these functional elements 220 would determine the behavior of their respective functional block (e.g., 201-203) and would interact with other functional entities of other functional blocks over well-defined interfaces specified over the respective reference points (e.g., main reference points 213 Or-Vnfm, Vi-VNFM, etc.).

With the decoupling of the functional elements of the NFV-MANO functional blocks, these functional elements can exist independently as micro-functions (mF), which can be deployed, instantiated, and managed independently (or as a group), thereby making the entire MANO space highly flexible and agile. According to the present invention, such decoupled MANO functional elements are called micro-MANO-Functions (mMF), or more generally as micro-functions (mF). The two terms mMF and mF are used herein interchangeably with the same meaning unless mentioned otherwise.

Individual mMF entities can be hosted on Virtual Machines (VM) or in virtualized containers (e.g., Docker containers), or in containers hosted inside VM(s). Each mF entity provides at least a single service towards managed entity. That is, a mF embodies at-least one functional role (or multiple functional roles) so as to provide a single service. The distribution of the MANO system into several independent mFs does not preclude the presence of the traditional MANO system, whose functional scope may be extended, or even limited, to manage these mF entities.

According to embodiments of the present invention, upon instantiation of a virtualized function (e.g., a Virtualized Network Function (VNF) or a Virtualized Application Function (VAF))—referred to as a Virtualized Function (VF) herein, its management tasks (or at least some parts of the management tasks) are taken over by the appropriate (and/or relevant and/or required) micro-MANO Function (mMF), or mF. By having the MANO functions exist as mFs, embodiments enable associating the mF instance(s) to individual Virtualized Functions (VF). Thus, each VF, either standalone or part of a virtualized service (e.g., Network Service (NS)) will be associated with one or more mMF, the type(s) of which will depend on the management and orchestration scope/requirement(s) of the VNF(s)/NS(s). These mMFs will then impart the MANO services prescribed within its respective service (and/or function) bounds to the VNF that they are associated with, thereby relieving the main MANO stack (e.g., the NFV-MANO—see FIG. 1) to address other management tasks, for example governance tasks and/or managing the mMF entities and/or other virtual functions (VF) that are not designed to be managed by the mMFs for full backward compatibility. The main MANO system will ensure that the relevant mMF(s) are properly associated to the required VFs and govern their respective operations.

An advantage of decoupling the entire MANO system into mFs (as provided by the present invention over the state of the art) is that it makes the MANO system highly distributed, enabling fine granular control over these mFs and providing localized management services to individual VFs at lower latencies. According to an embodiment, only these mFs can be associated to a VF that fulfils the management needs of the individual VFs, at least at a local level of the VF. The mFs that are associated to a VF can also inter-link with each other forming a composite management overlay, which is referred to herein as a micro-management service (mMS) layer.

Figure 3:
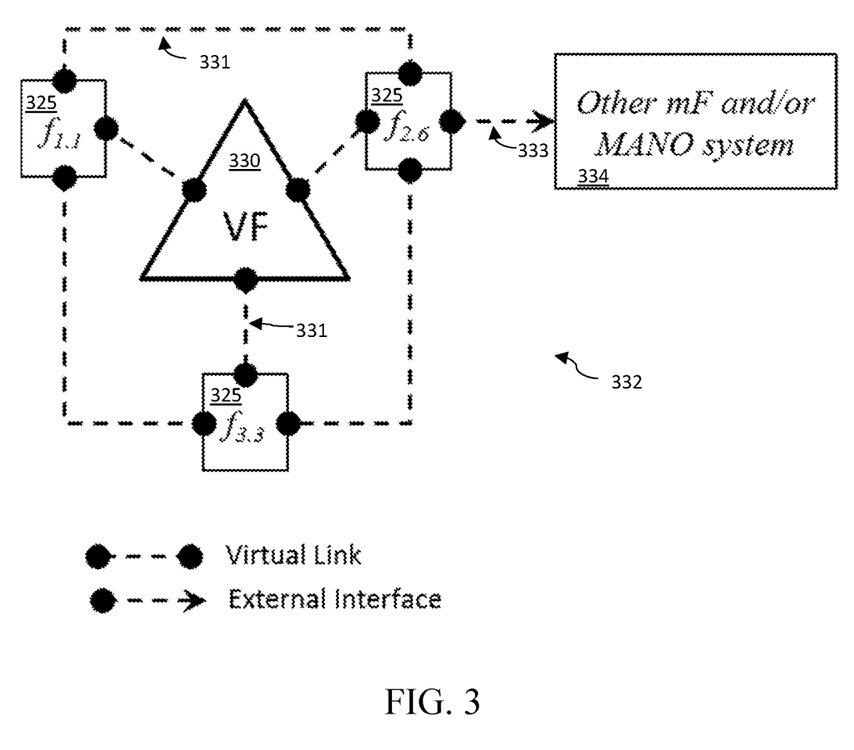
FIG. 3 illustrates a conceptual view of the mMFs associated to a Virtualized function (VF) forming a micro-management service (mMS) layer.

This concept is depicted in FIG. 3, where mFs 325—$f_{1.1}$, $f_{2.6}$, and $f_{3.3}$—are associated with a VF 330 and also link with each other via virtual links 331 to form a mMS layer 332. The mMS layer 332 allows for combining the individual mFs 325 towards providing extended management services.

Figure 6:
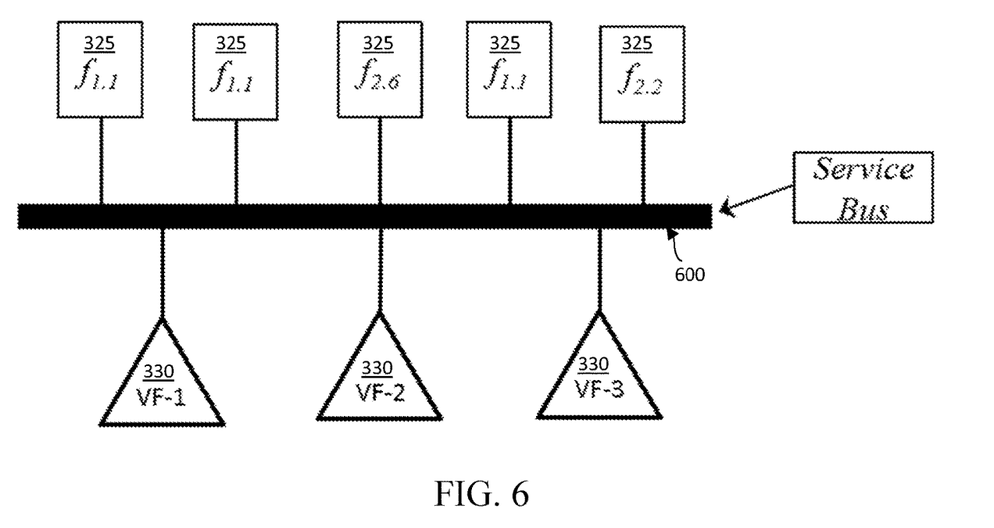
FIG. 6 illustrates an implementation option using service bus architecture.

For example, mF 325 $f_{3.3}$ can be a function monitoring and recording specific KPIs, which are provided to mFs 325 $f_{2.6}$ and $f_{1.1}$, where mF 325 $f_{2.6}$ may embody a specialized analytics algorithm while mF 325 $f_{1.1}$ may be a policy enforcement function defined for the specific VF 330. These mFs 325 may link with the managed entity (i.e., VFs/NS/VLs) and other mFs 325 over virtual links (VL) 331 or an external interface 333. Also, as shown in FIG. 6, mFs 325 and Vfs 330 may interact with each other over a common bus 600. Thus, the mFs 325 and the VNFs (e.g., VNF 109) can have common APIs over which they can interface with each other. For example, they can interact with each other over REST APIs.

Some MANO implementations like ONAP (see e.g., Linux Foundation—Open Network Automation Platform (ONAP) project, url:www.onap.org) provides MANO functions as separate entities, but there is a 1:N correspondence between a MANO function and the VFs. In other words, multiple VFs are sharing the same MANO functional instance, making the shared MANO functional entity as a bottleneck in case of performance issues due to resource overload. Also, an update/upgrade of the single MANO functional entity will impact all VFs associated with it.

In embodiments of the present invention, there is an N:N correspondence between a VF and mFs. This means that the each of the VFs, instead of sharing and interacting with a single mF instance, is provided its own mF. Thus, each VF has its own mF instance of a particular type. Moreover, these mFs can also link to mFs associated to other VFs. Thus, creating an extended mMS layer over a NS that is composed of multiple VNFs chained in a specific order for providing an end-to-end NS.

Figure 4:
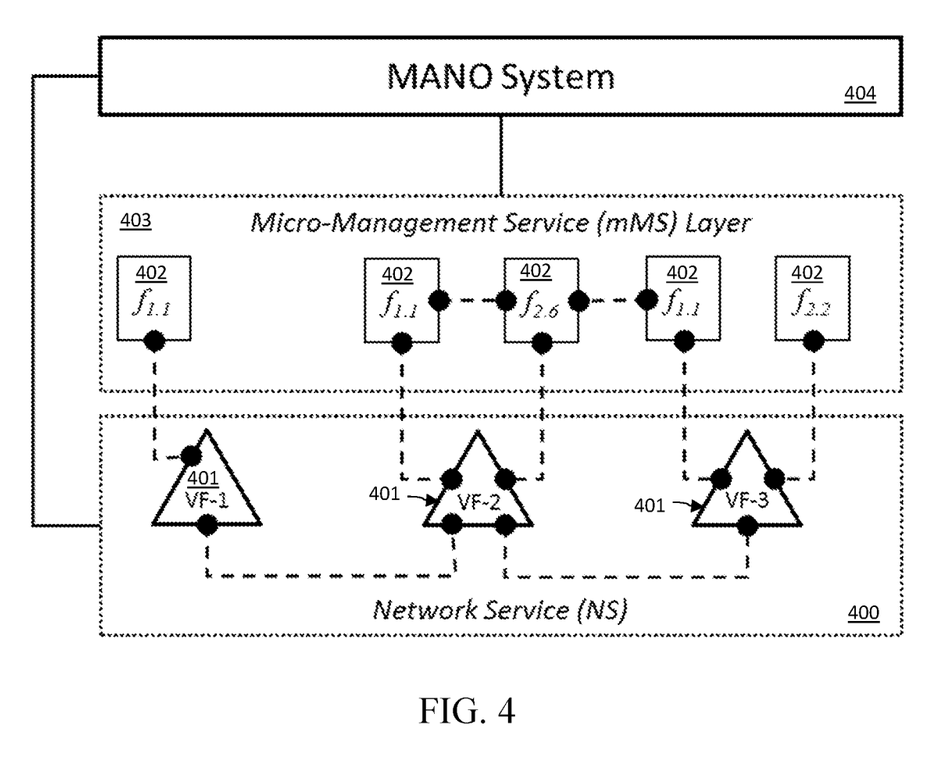
FIG. 4 illustrates an overview of a mMS layer managing a network service (NS) instance with reference to a MANO system.

This feature of embodiments is depicted in FIG. 4, where a NS instance 400 is composed of several VFs 401 (VF-1, VF-2 and VF-3) that are chained to provide a specific network service. Various mFs 402—which are associated with their respective VFs 401—are linked to each other to create a mMS layer 403 in order to provide a customized management overlay over the whole of the NS instance 400. With this N:N correspondence between a mF 402 and VF 401, any performance issue or update/upgrade operation on a mF 402 will impact only that associated VF 401 instance while the other VFs 401 will remain immune to any changes in the affected mF 402. For instance, it is possible to upgrade/update a specific instance of mF without having to update/upgrade similar mF instances that are associated with other VFs, provided that the APIs of the updated/upgraded mFs do not change. For example, the mF instance $f_{1.1}$ associated with VF-1 can be updated/upgraded without having to do similar updates/upgrades on $f_{1.1}$ instances associated with VF-2 and VF-3. This becomes more advantageous in case of multiple NS instances where an update/upgrade operation on the mF instances of one NS will not influence the similar mF instances of the other NS instance. Similarly, any performance issues in the mF instance(s) or the mMS layer of one NS instance will not affect the similar mF instance(s) or the mMS layer associated to the other NS instance. This fine-granular management exhibits inherent isolation thereby enabling the system owner to define fine-grained SLAs and charging and billing systems, and determine different maintenance cycles for respective VF/NS instances. Thus, having a more capitalistic management regimen in place.

Although the mMS layer 403 may form an independent distributed MANO system with respect to the NS instance 400 that it is managing, both the mMS layer 403 and the NS layer 400 can be under the management control of a main MANO system 404 (e.g., standard NFV-MANO system with relevant extensions (as described below), as shown in FIG. 4. Such a provision will allow for a more robust and reliable MANO system that combines the advantages of both a centralized and distributed system. Thus, providing an improvement over the state of the art.

Moreover, there can be a clean division of tasks between the mFs and the main MANO system. The mFs handle the local management tasks of the associated VFs and exercise local decisions and actions, while the main MANO system can be responsible for the LCM of the mFs (such as, deployment, instantiation, scaling, migrations, live update/upgrade, configuration, fault, performance, etc.) in addition to those of the VFs and NSs, and providing decision on actions that are outside the mandate of the mFs. In other words, the functional (and/or policy) scope of the management functions of the respective mFs is also determined and managed by the MANO system as specified by the MANO system administrator. For instance, a specific mF may be allowed to perform resource scaling operations on a VF, but that mF may still require permission from the main MANO system to perform the VF migration decision. A mF may also be given full operational control within its functional scope. Moreover, the main MANO system can also coordinate the management and orchestration decisions across the various mF entities within a mMS layer. The MANO system thus also keeps track of the mF instances that are deployed within an administrative domain. In other words, the main MANO system governs the mMFs, and thus, the mMS layer. The NFV-MANO stack may have full or partial administrative control of the mMF entities depending on the system setup.

Figure 5A:
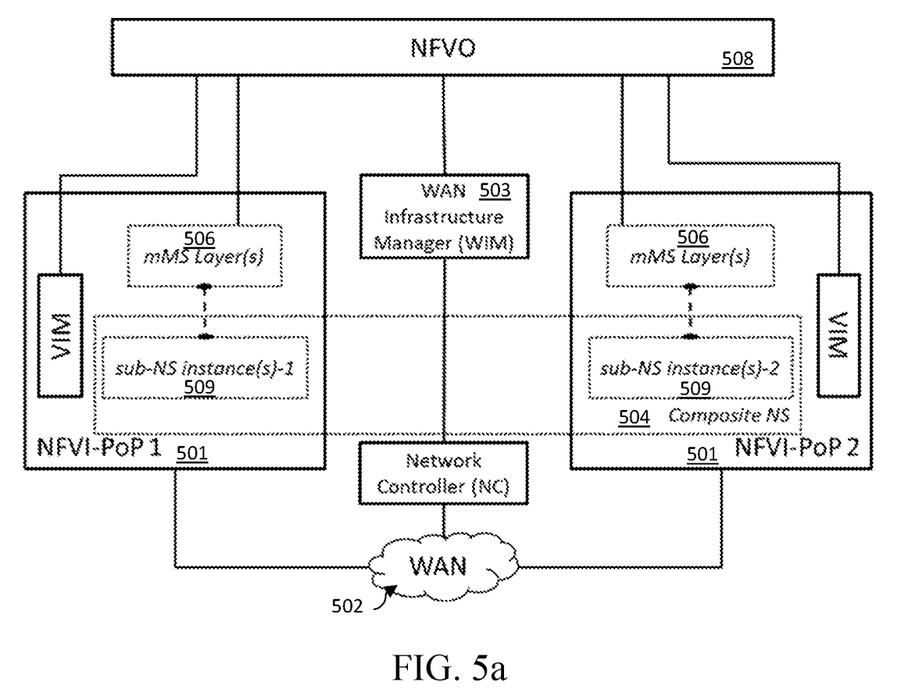
FIGS. 5a and 5b illustrate an overview of a Multi-site micro-Management Service (mMS) layer.
Figure 5B:
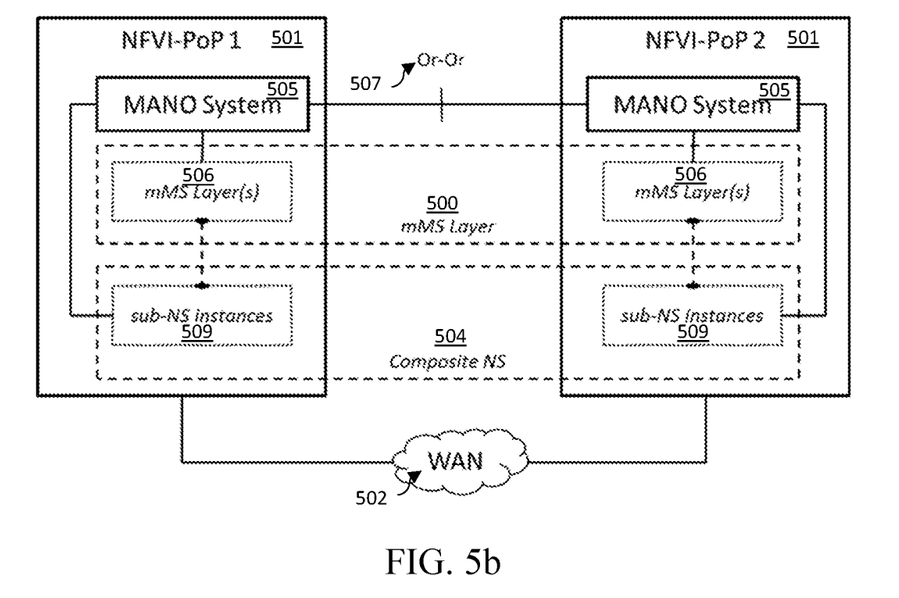

For NSs that are deployed over multiple datacenters (e.g., NFVI-PoPs), the mMFs in different datacenters (e.g., NFVI-PoPs) may logically link with each other forming a mMS layer for the respective NS. This is illustrated in FIGS. 5a and 5b. The embodiment shown in FIGS. 5a and 5b is made with reference to the standard NFV multi-site NS use case described in IFA022. See ETSI NFV ISG, "Report on Management and Connectivity for Multi-SiteServices," ETSI GR NFV-IFA 022 V3.1.1 (2018) (the entire contents of which are hereby incorporated by references herein).

FIGS. 5a and 5b show a multi-site mMS layer 500 formed between two NFVI sites 501 (i.e., NFVI-PoP1 and NFVI-PoP2) over a WAN infrastructure (e.g., including WAN 502 and WAN Infrastructure Manager (WIM) 503). The mMS layers 506 in the different NFVI sites 501 logically link with each other to form the composite mMS Layer 500 for a composite NS 504. The composite NS 504 is made up of the sub-NS instances 509 (e.g., sub-NS instance-1 and -2) for each NFVI site 501.

An NFVO 508 orchestrates the linking of resources and functionalities across the two NFVI sites 501 to create the composite NS 504.

In an embodiment, a main-MANO system is used to establish the association of the mMS layers in respective NFVI sites 501 (NFVI-PoPs) to form the composite mMS layer 500 over the multi-site NS instance 504. For example, the NFVO 508 may orchestrate the association across the NFVI-PoPs 501.

Another embodiment is shown in FIG. 5b, where a reference is made to the multi-domain/site MANO architecture option (e.g., IFA032, see ETSI NFV ISG, "Report on architecture options to support multiple administrative domains," ETSI GR NFV-IFA 028 V3.1.1, (2018), the entire contents of which are hereby incorporated by reference herein).

As shown in FIG. 5b, the MANO systems 505 in respective NFVI sites 501 coordinate the management of the mMS layers 506 in respective sites over a the standard Or-Or reference point 507 as a composite mMS layer.

Embodiments of the present invention can be implemented in a variety of ways. For example, the embodiment of FIG. 6 uses a service based architecture where the mFs 325 and the VFs 330 interact with each other over a common service bus 600, and use standard methods available for the VFs 330 and the mFs 325 to discover and associate with each other and form a mMS layer and interact with a MANO system itself. The mFs 325 and the VFs 330 may communicate with each other either using relevant bus protocol or even REST APIs.

Figure 7:
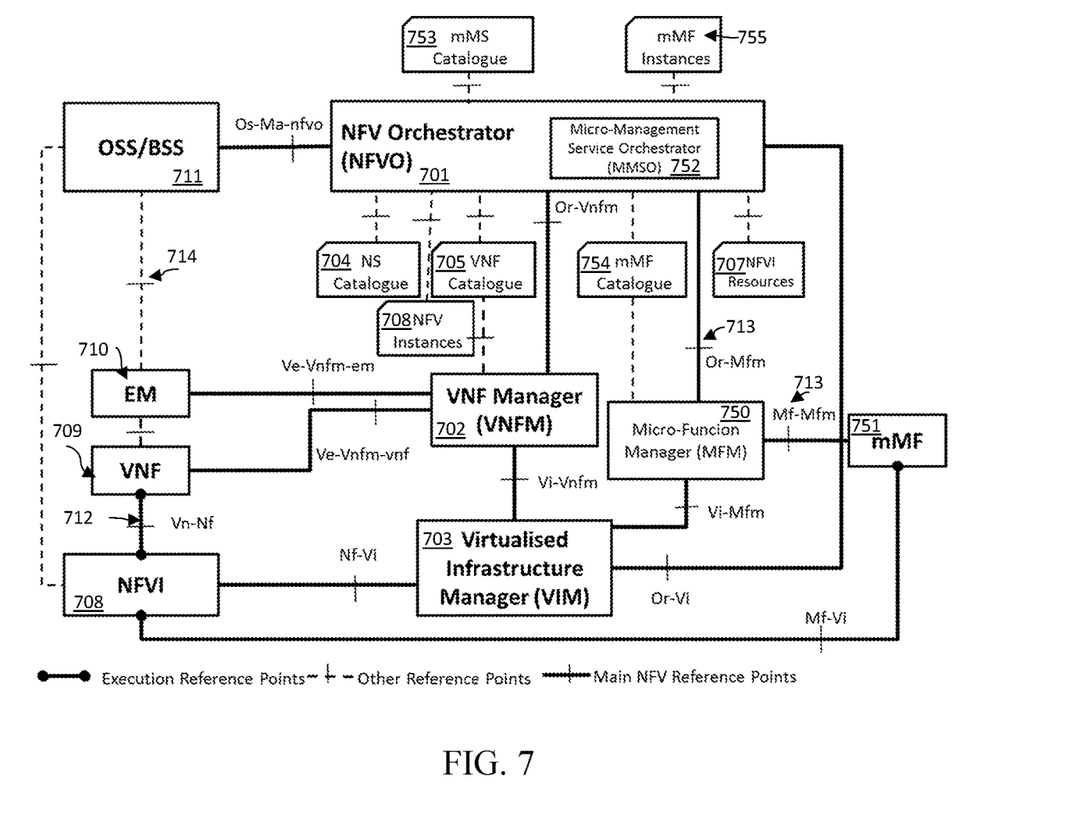
FIG. 7 illustrates an example embodiment for extending the standard ETSI NFV-MANO framework.

FIG. 7 illustrates an example embodiment that shows extensions to the standard NFV-MANO system to on-board, deploy, instantiate, and manage the mFs/mMS layer(s) of the present invention.

FIG. 7 depicts a micro-function manager (MFM) 750 functional entity that interacts with the NFVO 701 and VIM 703 functional blocks over the Or-Mfm and Vi-Mfm reference points 713, respectively. The MFM 750 provides the life-cycle management (LCM) of the individual mMF instances 751 over Mf-Mfm reference points 713, similar to the VNFM 702 performing the LCM of VNF instances 709 (see, e.g., ETSI ISG NFV, "Network Function Virtualization; Management and Orchestration", ETSI GS NFV-MAN 001 (2014), the entire contents of which are hereby incorporated by reference herein).

In an embodiment, the MFM 750 functional block is integrated within the VNFM 702.

For the LCM of the mMS layer, the micro-management service orchestrator (MMSO) 752 can be integrated within the NFVO 701 block, which interacts with the MFM 750 and VIM 703 over the Or-Mfm reference point 713 of an embodiment of the present invention and the standard Or-Vi reference point 713 with new and/or extended interfaces. The interactions over the novel reference points of the present invention and standard reference points can be done over new and/or extended interfaces. Interfaces for management operations on mFs—such as but not limited to, performance management, fault management, resource management, image management, policy management, etc.—can be further developed by one skilled in the art of NFV MANO, such that it provides actions for performing the LCM of mF/mMS-layer instances.

For the MANO system to support the LCM of mMF/mMS instances, relevant catalogues and repositories are also provided (such as shown in FIG. 7) that contain the relevant information elements related to mMF and mMS instances. For example, the following catalogues/repositories may be provided: mMS catalogue 753; mMF catalogue 754; and mMF instances 755.

The mMS catalogue 753 is accessible to the MMSO 752, and includes a mMS descriptor (mMSD) file and the mMS topology (mMST) file. The mMSD contains static information that is used by the MMSO 752 to instantiate an mMS layer, which is formed by mMFs interlinked over virtual links (VL) in the order described by the mMST file. It also contains information on the characteristics of the VLs and the infrastructure resources (e.g., compute, networking, memory). For the VL information, the mMS-layer catalogue 753 can utilize the existing VL Descriptor (VLD) file of the NFV-MANO system.

The mMF catalogue 754 is accessible to both the MMSO 752 and the MFM 750 functional blocks. It contains the mMF Descriptor (mMFD) file, which is a deployment template describing a mMF in terms of deployment and operational behavior requirements. The mMFD also contains connectivity, interface, and KPIs requirements that can be used by MMSO 752 and MFM 750 in collaboration with VIM 703 to establish appropriate VLs between mMF instances 751, and between itself and the VNF instance 709.

The mMF instances 755 is a repository that maintains the run-time information/attributes (i.e., state information) of mMFs and the mMS-layer that are deployed and active. For instance, it will maintain an index of the virtualized resources allocated to each mMF instance and also maintain an updated record of the performance KPIs relevant to the respective mMF instance(s) in order to enable the MMSO 752 to perform LCM action. It will maintain sufficient information to allow future changes to the deployed mMF instance in the light of e.g., a scalability update. There can be multiple design options for the development of such a repository, which should be evident to any one skilled in the art of MANO system design.

According to an embodiment, the respective mMF may also maintain its state information locally and may also exchange it with other member mMFs in the mMS-layer for coordinated management decisions on actions.

According to an embodiment, the relevant (and/or required) software images of the mMFs are already on-boarded to the NFV-MANO along with their respective descriptor files.

The NFV system of FIG. 7 includes other functional blocks and elements associated with the NFV-MANO system standards, including the OSS/BSS 711, EM 710, NFVI 708, NS catalogue 704, VNF catalogue 705, NFV instances repository 708. These elements function substantially the same as their corresponding elements discussed above in FIG. 1. FIG. 7 also illustrates reference points 712-714 indicating communication links among the various functional blocks, repositories and directories of the system.

Embodiments of the present invention can have an implication on the VNF design, where in addition to interfacing with the traditional MANO systems (e.g., NFV-MANO, OSM, ONAP), it has to now interface with the mMFs. It is important for both the VNFs and the mMFs to develop well-defined interfaces, which will allow the mMFs to associate with the VNFs to carry out respective tasks. By extension, embodiments can also impact the VNFD file, where additional relevant information regarding preferred mMFs including the capabilities expected of the mMF(s) and interfaces for the VNF may be specified.

In an embodiment, the traditional MANO system is extended by incorporating the functional entities that will manage and orchestrate the mMFs and mMS-layers. This can be done, for example, by extending existing and developing new interfaces and information elements over standard and new reference points, such as illustrated in FIG. 7 and discussed above.

Figure 8:
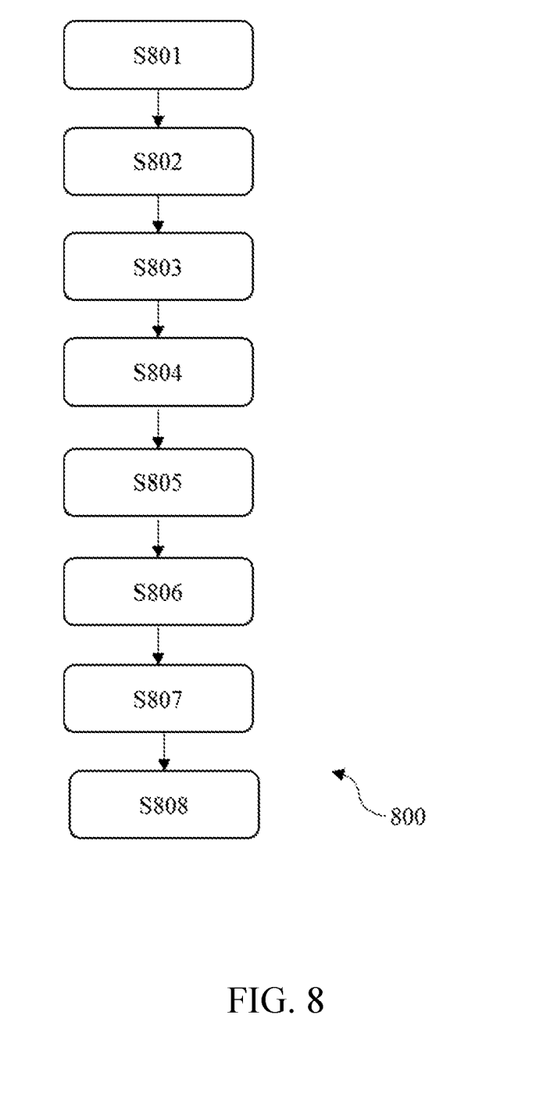
FIG. 8 is a block diagram illustrating a method of the present invention.

FIG. 8 illustrates an embodiment of the present invention that provides a method 800 for providing a highly distributed and fine granular management and orchestration of VFs and NSs. The method 800 of FIG. 8 illustrates the operations occurring in series; however, embodiments are not so limited, and operations may be performed in parallel and/or in other orders.

The method 800 includes providing an NFV MANO system with additional mMS catalogue, mMF catalogue, and mMF instances (S801). The mMFs, along with their respective descriptor files, are then on-boarded to an image repository of the NFV MANO system (S802). This creates and extended NFV-MANO that is capable of deploying and instantiating mFs.

The extended NFV-MANO system deploys and instantiates mFs, and then links the mMFs to individual VNF components (S803).

A VNFD—such as a standard VNFD extended to identify the type and capabilities of mMF(s) to which it can interface—is also provided (S804).

The VFs and mFs expose interfaces over which they can interface (S805).

The extended NFV-MANO system enables the mFs to interconnect with each other, which forms an mMS layer (S806).

The extended NFV-MANO system is then employed for the LCM of mMF and mMS layer instances—such as, scale, migrate, update/upgrade, deploy, instantiate, configure, resource management etc. (S807).

The extended NFV-MANO system monitors the performance of the mMF/mMS-layer instances, and also ensures the management autonomy of the respective mMF instances within subscribed bounds (S808).

Figure 9:
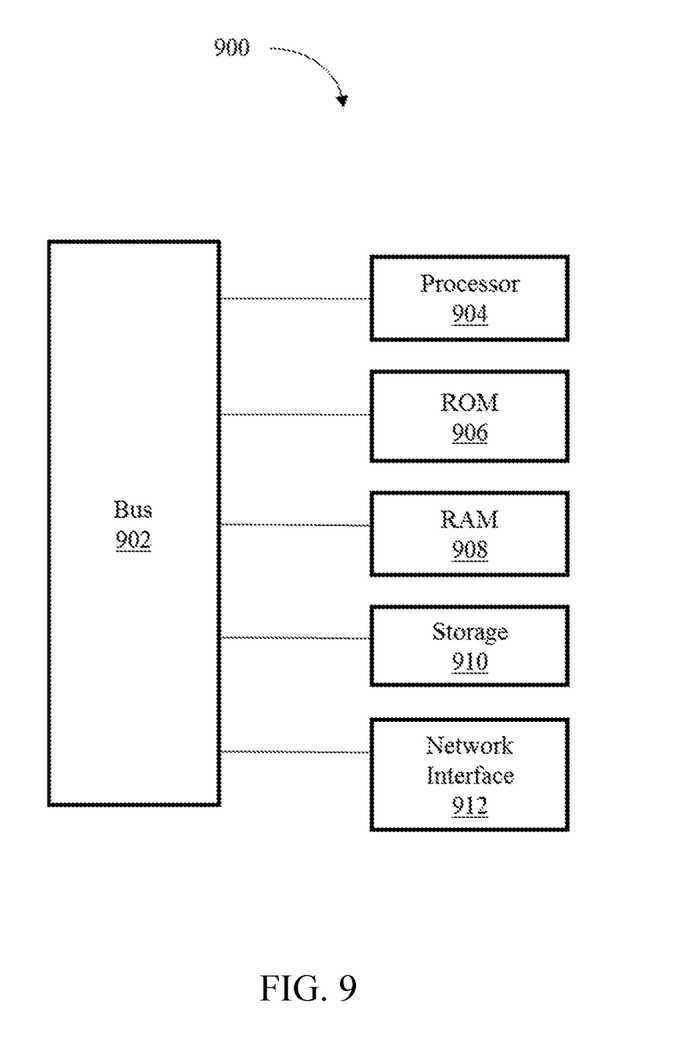
FIG. 9 is a block diagram of a processing system according to an embodiment.

FIG. 9 is a block diagram of a specialized NFV-MANO processing system according to an embodiment. The processing system 900 can be used to implement the protocols, devices, mechanism, systems and methods described above. The processing system 900 includes a processor 904, such as a central processing unit (CPU) of a computing device or a distributed processor system. The processor 904 executes processor executable instructions to implement embodiments of the system for performing the functions and methods described above. In embodiments, the processor executable instructions are locally stored or remotely stored and accessed from a non-transitory computer readable medium, such as storage 910, which may be a hard drive, cloud storage, flash drive, etc. Read Only Memory (ROM) 906 includes processor executable instructions for initializing the processor 904, while the random-access memory (RAM) 908 is the main memory for loading and processing instructions executed by the processor 904. The network interface 912 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing a distributed and granular management and orchestration of virtualized functions (VFs), the method comprising:

instantiating a network function virtualization management and orchestration (NFV-MANO) system that is modularized as a set of micro-functions (MFs), which are independent and self-contained functional entities each having a corresponding management role for the NFV-MANO system, the NFV-MANO system being configured to instantiate the MFs and to link each of the instantiated MFs to a corresponding one of the VFs; and instantiating a MF of the MFs and linking the MF to a VF of the VFs;

wherein the instantiated MF is configured to provide at least one service of the NFV-MANO system to the VF to which it is linked, and wherein the instantiated MF and the VF are configured to expose interfaces over which they can interface with each other, wherein the method further comprises:
 instantiating a second MF of the MFs and linking the second MF to a second VF of the VFs; and
 linking the MF and the second MF together to form a micro-management service (mMS) layer on top of a network service comprising the VF and the second VF.

2. The method of claim 1, wherein the MF is instantiated in a virtual machine, in a virtual container, or in a container hosted in the virtual machine.

3. The method of claim 1, wherein the at least one service of the NFV-MANO system implements at least one of a service of a network function virtualization orchestrator (NFVO), virtualized network function manager (VNFM), or a virtualized infrastructure manager (VIM).

4. The method according to claim 1, the method further comprising executing life cycle management (LCM) operations for at least one of the MF, the second MF, and the mMS layer, the LCM operations comprising at least one of scale, migrate, update, upgrade, deploy, instantiate, configure, or resource management.

5. The method according to claim 1, the method further comprising monitor performance of at least one of the MF, the second MF, and the mMS layer to ensure management autonomy of the respective MFs within subscribed bounds.

6. The method according to claim 1 wherein the NFV-MANO system is extended to comprise: a micro-management service orchestrator (MMSO), the MMSO being configured to manage a lifecycle of at least one mMS Layer instance, the mMS Layer instance being comprised of the instantiated MF linked to the corresponding instantiated VF; and a micro-function manager (MFM), the MFM being configured to manage a lifecycle of the instantiated MF.

7. The method according to claim 1, wherein the NFV-MANO comprises at least one of a catalogue or a repository that contains at least one of information for instantiating a micro-management service (mMS) layer which is formed by linking at least two of the MFs, information on characteristics of virtual links (VLs) for linking the MFs and the VFs, and information on infrastructure resources associated with the NFV-MANO.

8. The method according to claim 1, wherein the NFV-MANO comprises at least one of a catalogue or a repository that contains at least one of a deployment template describing at least one of the MFs in terms of deployment and operation behavior requirements, and connectivity, interface, or KPI requirements for establishing virtual links (VLs) between MFs.

9. The method according to claim 1, wherein the NFV-MANO comprises at least one of a catalogue or a repository that contains at least one of run-time information of the MFs or a micro-management service (mMS) layer, which is instantiated by linking at least two of the MFs, that are instantiated.

10. The method according to claim 1, the method further comprising instantiating a virtualized network function descriptor (VNFD) that is configured to identify a type and capability of the MF to which it is to interface.

11. The method according to claim 1, wherein there is an N:N correspondence between the instantiated VF and the instantiated mFs.

12. The method according to claim 11, wherein the VF is part of a network service (NS).

13. A management and orchestration (MANO) system that is modularized as a set of micro-functions (MFs), which are independent and self-contained functional entities each having a corresponding management role for the MANO system, the MANO system comprising a processor coupled to a non-transitory storage memory containing instructions, which when executed by the processor, cause MANO system to execute a method comprising:

instantiating a micro-function (MF) of the MFs and link the MF to a virtualized function (VF);

wherein the instantiated MF is configured to provide at least one service of the MANO system only to the VF to which it is linked, and wherein the instantiated MF and the VF are configured to expose interfaces over which they can interface with each other, wherein the method further comprises:
 instantiating a second MF of the MFs and linking the second MF to a second VF of the VFs; and
 linking the MF and the second MF together to form a micro-management service (mMS) layer on top of a network service comprising the VF and the second VF.

14. A non-transitory processor-readable storage medium storing instructions that upon execution cause a management and orchestration (MANO) system to execute a method comprising:

instantiating a micro-function (MF) and link the MF to a virtualized function (VF);

wherein the instantiated MF is configured to provide at least one service of the MANO system only to the VF to which it is linked, and wherein the instantiated MF and the VF are configured to expose interfaces over which they can interface with each other, wherein the MANO system is modularized as a set of micro-functions (MFs) comprising the MF, which are independent and self-contained functional entities each having a corresponding management role for the MANO system, wherein the method further comprises:
 instantiating a second MF of the MFs and linking the second MF to a second VF of the VFs; and
 linking the MF and the second MF together to form a micro-management service (mMS) layer on top of a network service comprising the VF and the second VF.

15. A method for providing a distributed and granular management and orchestration of virtualized functions (VFs), the method comprising:

instantiating a network function virtualization management and orchestration (NFV-MANO) system that is modularized as a set of micro-functions (MFs), which are independent and self-contained functional entities each having a corresponding management role for the NFV-MANO system, the NFV-MANO system being configured to instantiate the MFs and to link each of the instantiated MFs to a corresponding one of the VFs;

instantiating a MF of the MFs and linking the MF to a VF of the VFs;

wherein the instantiated MF is configured to provide at least one service of the NFV-MANO system to the VF to which it is linked;

wherein the instantiated MF and the VF are configured to expose interfaces over which they can interface with each other; and wherein the NFV-MANO system is extended to comprise: a micro-management service orchestrator (MMSO), the MMSO being configured to manage a lifecycle of at least one mMS Layer instance, the mMS Layer instance being comprised of the instantiated MF linked to the corresponding instantiated VF; and a micro-function manager (MFM), the MFM being configured to manage a lifecycle of the instantiated MF.

16. A method for providing a distributed and granular management and orchestration of virtualized functions (VFs), the method comprising:

instantiating a network function virtualization management and orchestration (NFV-MANO) system that is modularized as a set of micro-functions (MFs), which are independent and self-contained functional entities each having a corresponding management role for the NFV-MANO system, the NFV-MANO system being configured to instantiate the MFs and to link each of the instantiated MFs to a corresponding one of the VFs;

instantiating a MF of the MFs and linking the MF to a VF of the VFs;

wherein the instantiated MF is configured to provide at least one service of the NFV-MANO system to the VF to which it is linked;

wherein the instantiated MF and the VF are configured to expose interfaces over which they can interface with each other; and wherein the NFV-MANO comprises at least one of a catalogue or a repository that contains at least one of information for instantiating a micro-management service (mMS) layer which is formed by linking at least two of the MFs, information on characteristics of virtual links (VLs) for linking the MFs and the VFs, and information on infrastructure resources associated with the NFV-MANO.

* * * * *